United States Patent Office 2,734,074
Patented Feb. 7, 1956

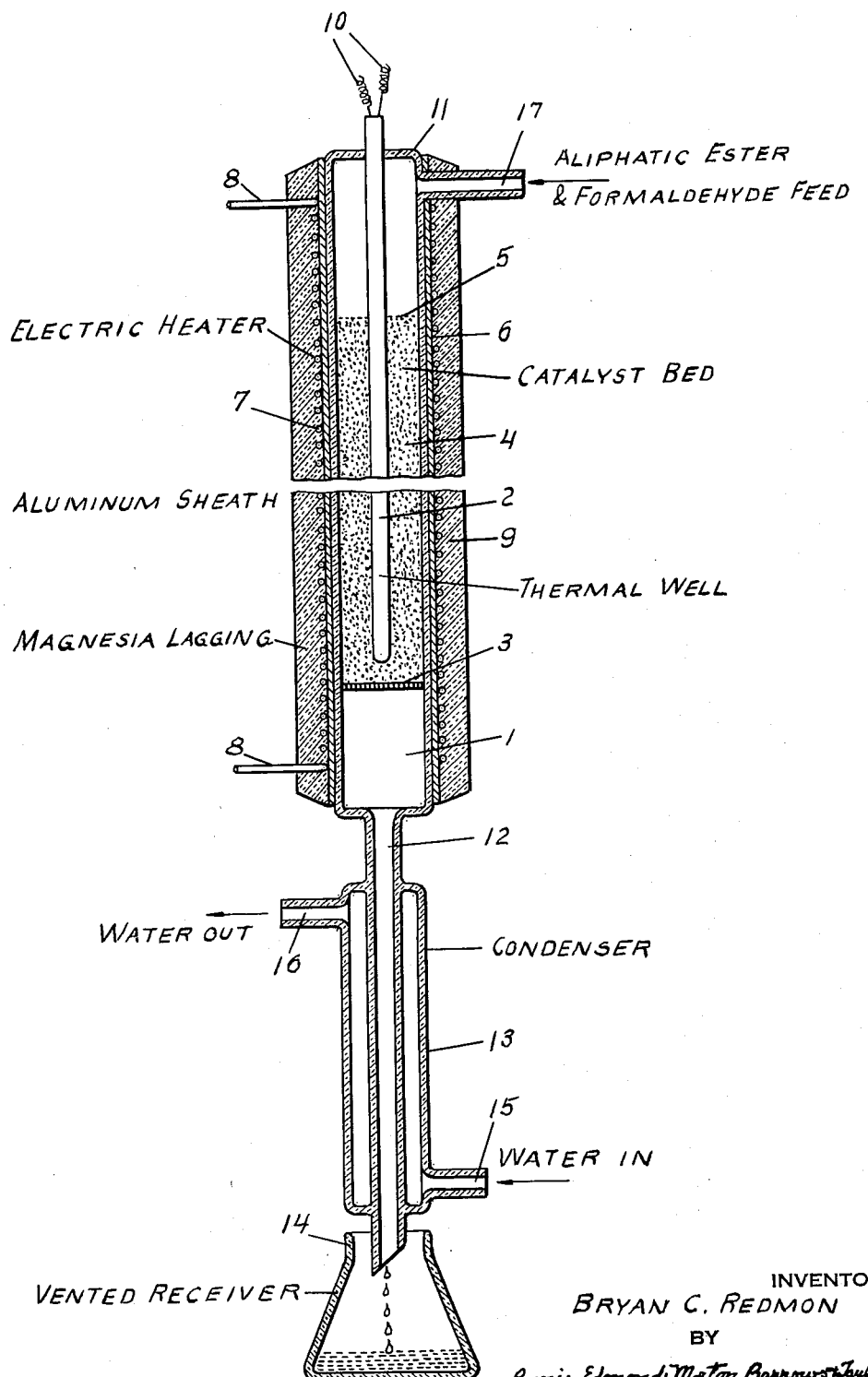

2,734,074

ACRYLIC ESTERS BY FORMALDEHYDE CONDENSATION

Byran C. Redmon, Baltimore, Md., assignor to National Distillers Products Corporation, New York, N. Y., a corporation of Virginia Application December 3, 1952, Serial No. 323,882

6 Claims. (Cl. 260—486)

This invention relates to the synthesis of acrylic esters and provides an improved process whereby such esters may economically be produced from readily available compounds.

Alkyl acrylates are widely used in the industry in the manufacture of various resins, polymers, and the like. Ordinarily, these esters are produced by first preparing acrylonitrile, then hydrolyzing the acrylonitrile and finally esterifying the hydrolyzed acrylonitrile with a suitable alcohol.

I have now discovered that alkyl esters may be caused to react with formaldehyde to form directly corresponding acrylic esters by passing substantially anhydrous, mixed vapors of the two in contact with a dehydration catalyst, as hereinafter more fully described.

This reaction may be represented by the following equation:

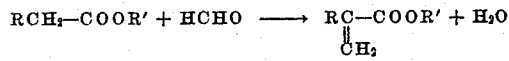

in which R represents hydrogen, or a lower alkyl radical, and R' represents a lower alkyl radical. It will be understood that, by the term lower alkyl herein and in the appended claims, I mean alkyl radicals containing a sufficiently low number of carbon atoms such that the alkyl ester will be readily vaporizable without substantial decomposition, say, alkyl radicals containing not more than about six carbon atoms.

Predicated upon this discovery my present process comprises passing a substantially anhydrous vapor mixture of formaldehyde and a lower alkyl ester in contact with a catalytic material composed of a dehydration catalyst suspended on a suitable support and heated to an elevated temperature.

As the catalyst, I have found lead acetate suspended on silica gel to be most effective. However, in place thereof, I may use other similar catalysts, known to promote condensation with elimination of water, for instance, lead chromate on silica gel, zinc chromite on silica gel, vanadia on alumina, zirconia on silica gel, zirconia and cadminum oxide on silica gel, or lead sulfate on silica gel.

Where a silica gel is used as the support, it appears to contribute in promoting the reaction. In this respect, silica gel has been found more advantageous than alumina as the catalyst support.

The temperature to which the catalytic bed is heated may be varied somewhat. I have found temperatures within the range of 325° to 425° C., and especially 340° to 400° C. to be particularly effective.

The proportion of formaldehyde to aliphatic ester in the vapor mixture may be varied over a considerable range extending from about 1 mol of formaldehyde for each 10 mols of ester to as low as 1 mol of formaldehyde for each 100 mols of ester. Larger yields are generally obtained where this ratio is somewhat less than 1:10. Concentrations of formaldehyde in excess of 10 molar per cent have been found seriously to interfere with the yield of the acrylic ester.

Similarly, the space-velocity of the vapor mixture through the catalyst bed is subject to considerable variation. However, I have found that, for commercially feasible results, the space-velocity should be within the range of about 100 to about 500 cubic feet per hour per cubic foot of catalyst, the volume of the vapors being calculated at standard conditions.

As previously indicated, the vapor mixture passed in contact with the catalyst, should be substantially anhydrous. I have further found that the presence of any substantial proportions of alcohol seriously impairs the yield of the process. Accordingly, for optimum results, the vapor mixture should not only be substantially free from water, but should also be substantially free from alcohol. Any alcohol introduced as a contaminant of the alkyl esters should be kept at a minimum, and care should be exercised to avoid the injection of water vapors with the formaldehyde. It is usually advantageous to supply the formaldehyde as paraformaldehyde vapors, thus avoiding the use of aqueous formaldehyde.

The invention will be further described with reference to the accompanying drawing, which represents conventionally and somewhat diagrammatically apparatus found especially effective in carrying out the process on a laboratory scale.

Referring to the drawing, a 31 mm. I. D. Pyrex glass tube, extending vertically a distance of about 4 feet, is indicated at 1, and a coaxially positioned 8 mm. O. D. thermal well 2 extends over the length of the tube. Near the lower end of this tube there is positioned a screen support 3 and, resting upon the support and filling the annular space within the tube surrounding the thermal well is a bed of catalytic material 4, extending to a height of approximately three feet, the upper surface of the bed being indicated at 5 and the volume of the bed being 630 ml.

The tube 1 is coated with a layer of aluminum foil 6 around which there is coiled an electric heating unit 7 composed of electrically insulated Nichrome wire connected at either end to the leads 8 and adapted to heat the tube uniformly. The tube and heating element is covered with a layer of magnesia heat-insulation 9.

Extending into the thermal well is a thermocouple, the lead wires to which are indicated at 10, for determining the temperature of the catalyst bed, and the upper end of the tube 1 is sealed at 11 to prevent escape of vapors.

An exit vapor tube 12 is sealed into the lower end of tube 1 and extends downwardly therefrom through a water jacketed condenser 13 into the upper end of a vented receiver flask 14. Cooling water is passed through the jacket 13 by means of inlet 15 and outlet 16.

In operation, the vapor mixture of alkyl ester and formaldehyde, either as such or in the form of paraformaldehyde, is fed into the upper end of tube 1 at 17 and passes downwardly through the heated catalyst bed, wherein the alkyl ester and formaldehyde react to form the acrylic ester which passes from the lower end of tube 1 in admixture with excess alkyl ester, is condensed and collected in the receiver 14 and the acrylic ester is separated from the unreacted alkyl ester by distillation, or other suitable means. The unreacted alkyl ester may be recycled through the process in admixture with further formaldehyde.

The invention will be illustrated by the following specific examples of the process carried out in the apparatus just described. In each instance, the catalyst used was composed of lead acetate suspended on silica gel and was prepared as follows:

A solution of 73 grams of lead monoxide, 73 ml. of glacial acetic acid, and 173 ml. of water was poured over 600 grams of desiccant-grade silica gel, the excess liquid was evaporated and the solids were heated to 300–370° C., and then steamed until the condensate therefrom contained less than 0.02 equivalent of acid per liter. Finally 5 liters of methyl acetate was passed in contact with the solid heated to a temperature of 340–370° C.

Example I

Methyl propionate and paraformaldehyde were separately vaporized, at the rate of 2.5 mols per hour of methyl propionate and the equivalent of 0.128 mol per hour of formaldehyde, the vapors mixed and passed through the catalyst bed maintained at a temperature of 360–370° C. The vapors flowing from the bottom of the catalyst bed were condensed and collected, and in a period of 5 hours of operation, at the indicated rate, 0.43 mol of methyl methacrylate was formed, the conversion of formaldehyde to acrylate being 67%.

Example II

In the manner described in Example I, methyl acetate and paraformaldehyde were vaporized and passed through the catalyst bed at a rate of 2.36 mols per hour of methyl acetate and the equivalent of 0.164 mol per hour of formaldehyde, the catalyst bed being maintained at 360° C. The condensate collected over a period of about 5 hours contained 0.35 mol of methyl acrylate, the conversion being 42.5% based on the formaldehyde.

As previously noted, the molar composition of the feed should not exceed about 10 mol per cent of formaldehyde. Further, because of undesirable dilution of the acrylate product, it has been found impractical to use in the feed less than 1 mol per cent of formaldehyde equivalent. In an operation substantially identical with that of Example II except that the equivalent of formaldehyde in the feed was increased to 14.8 mol per cent, the conversion of formaldehyde to methyl acrylate dropped to 22%.

In a further operation substantially identical with Example II using as the feed 15.75 parts of methyl acetate to 1 part of formaldehyde, the latter being evaporated from a 37% formalin solution and the feed containing the water vapor from the solution, the conversion of the formaldehyde to methyl acrylate dropped to 26%.

Example III

By the procedure of Example I, ethyl acetate and paraformaldehyde were vaporized, the vapors mixed and passed through the catalyst bed at a rate of 2.5 mols per hour of ethyl acetate and the equivalent of 0.137 mol per hour of formaldehyde, the catalyst bed being maintained at a temperature of 370° C. In a 5 hour period of operation, there was obtained 0.26 mol of ethyl arcylate, the conversion of formaldehyde to acrylate being 31.5%.

Example IV

N-butyl acetate and paraformaldehyde were vaporized, the vapors mixed and passed through the catalyst bed at the rate of 2.5 mols per hour of the acetate, and the equivalent of 0.208 mol per hour of formaldehyde, the temperature of the catalyst bed being maintained at 400–415° C. The condensate collected from a six hour period of operation contained 0.16 mol of n-butyl acrylate, this representing a conversion of formaldehyde to acrylate of 13%.

In the foregoing examples, we have illustrated the process as applied to methyl propionate, methyl acetate, ethyl acetate and n-butyl acetate. In these tests, methyl propionate and methyl acetate were found to give the most satisfactory yields of the corresponding acrylic esters. It will be understood, however, that the invention contemplates the use of any of the alkyl esters specifically mentioned herein and also other lower alkyl esters, i. e., esters which are readily vaporizable without substantial decomposition, for instance, ethyl butyrate, isobutyl acetate, propyl acetate, or isopropyl acetate.

I claim:
1. Process for the synthesis of acrylic esters which comprises passing a substantially anhydrous mixture of vapors of formaldehyde and an alkyl ester of the formula R—$CH_2$—COOR', in which R is selected from the group consisting of hydrogen and lower alkyl radicals and R' is a lower alkyl radical, in which the proportion of formaldehyde to ester is within the range of 0.01 to 0.1 mol of formaldehyde per mol of the ester, in contact with a dehydration catalyst heated to the reaction temperature.

2. The process of claim 1 in which the catalyst is maintained at a temperature within the range of 325 to 425° C.

3. The process of claim 1 in which the catalyst is composed of a suspension of lead acetate on silica gel.

4. The process of claim 1 in which the alkyl ester is methyl propionate.

5. The process of claim 1 in which the alkyl ester is methyl acetate.

6. The process of claim 1 in which the alkyl ester is ethyl acetate.

References Cited in the file of this patent

Bachman and Tanner: Journal Organic Chemistry, vol. 4, pgs. 493–501 (1939).